(12) United States Patent
Takahashi et al.

(10) Patent No.: US 12,182,196 B2
(45) Date of Patent: Dec. 31, 2024

(54) IMAGE RETRIEVAL SYSTEM, IMAGE RETRIEVAL METHOD, AND STORAGE MEDIUM

(71) Applicant: NEC CORPORATION, Tokyo (JP)

(72) Inventors: Toru Takahashi, Tokyo (JP); Rui Ishiyama, Tokyo (JP); Kengo Makino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 337 days.

(21) Appl. No.: 17/640,687

(22) PCT Filed: Dec. 25, 2019

(86) PCT No.: PCT/JP2019/050862
§ 371 (c)(1),
(2) Date: Mar. 4, 2022

(87) PCT Pub. No.: WO2021/130906
PCT Pub. Date: Jul. 1, 2021

(65) Prior Publication Data
US 2022/0327157 A1    Oct. 13, 2022

(51) Int. Cl.
*G06F 16/583* (2019.01)
*G06T 7/00* (2017.01)
*G06V 10/22* (2022.01)

(52) U.S. Cl.
CPC ........... *G06F 16/583* (2019.01); *G06T 7/001* (2013.01); *G06V 10/22* (2022.01); *G06T 2207/30108* (2013.01)

(58) Field of Classification Search
CPC ...... G06V 10/96; G06V 18/214; G06V 10/95; G06F 16/583; G06F 18/214
See application file for complete search history.

(56) References Cited

U.S. PATENT DOCUMENTS

| 8,073,263 B2* | 12/2011 | Hull ........................ G06V 10/96 |
| | | 707/751 |
| 8,510,283 B2* | 8/2013 | Hull ........................ G06F 18/214 |
| | | 707/723 |

(Continued)

FOREIGN PATENT DOCUMENTS

| JP | 2013-185862 A | 9/2013 |
| JP | 2017-64387 A | 4/2017 |

(Continued)

OTHER PUBLICATIONS

Extended European Search Report for EP Application No. 19957798.2 dated on Nov. 23, 2022.

(Continued)

*Primary Examiner* — Yosef Kassa
(74) *Attorney, Agent, or Firm* — Sughrue Mion, PLLC

(57) ABSTRACT

This image retrieval system comprises: a storage means for storing a plurality of registered images capturing a plurality of objects to be registered; an acquisition means for acquiring a retrieval image including a region of interest; an extraction means for extracting a feature amount from a region, in the retrieval image, other than the region of interest; a retrieval means for retrieving, from the plurality of registered images stored in the storage means, a registered image having a feature amount that matches the feature amount extracted by the extraction means; and an output means for outputting, in a manner that makes it possible to recognize a region corresponding to the region of interest in the retrieval image, all or a portion of the registered image retrieved by the retrieval means.

20 Claims, 26 Drawing Sheets

(56) References Cited

U.S. PATENT DOCUMENTS

| | | | | |
|---|---|---|---|---|
| 8,825,682 B2* | 9/2014 | Kishi | ............... | G06V 30/414 |
| | | | | 707/711 |
| 8,856,108 B2* | 10/2014 | Erol | ............... | G06V 30/414 |
| | | | | 707/723 |
| 8,868,555 B2* | 10/2014 | Erol | ............... | G06F 16/955 |
| | | | | 707/736 |
| 9,870,388 B2* | 1/2018 | Erol | ............... | G06V 10/993 |

FOREIGN PATENT DOCUMENTS

| | | |
|---|---|---|
| JP | 2017-68838 A | 4/2017 |
| JP | 2018-19896 A | 2/2018 |
| JP | 2018-205025 A | 12/2018 |
| WO | 2013/018614 A1 | 2/2013 |

OTHER PUBLICATIONS

Elkapelli, Shailaja S et al: "A review: Region of interest based image retrieval", 2016 Online International Conference on Green Engineering and Technologies (IC-GET), IEEE, Nov. 19, 2016 (Nov. 19, 2016), pp. 1-6.

International Search Report for PCT/JP2019/050862 dated, Mar. 17, 2020 (PCT/ISA/210).

Written Opinion of the International Searching Authority for PCT/JP2019/050862 dated, Mar. 17, 2020 (PCT/ISA/237).

* cited by examiner

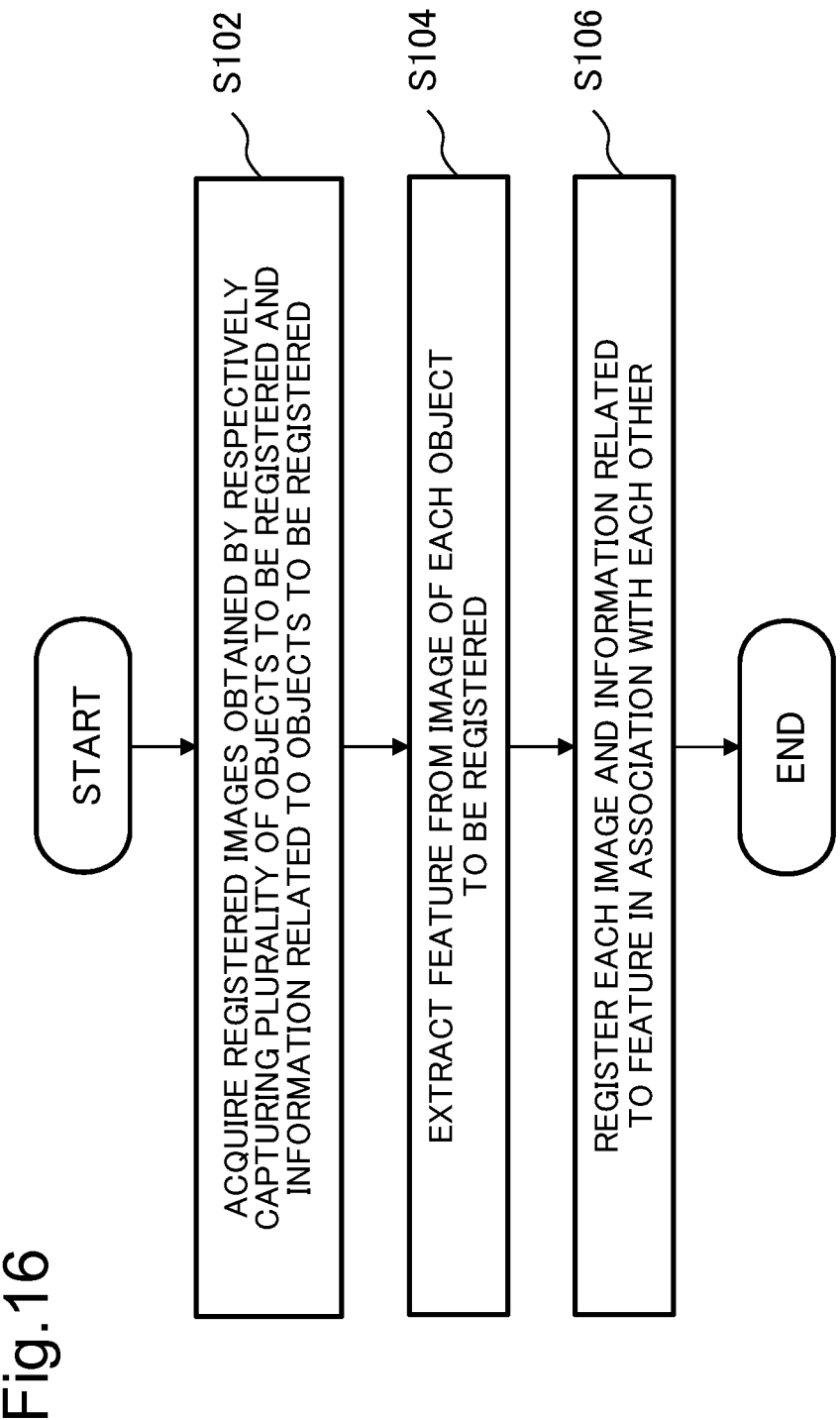

IMAGE RETRIEVAL SYSTEM, IMAGE RETRIEVAL METHOD, AND STORAGE MEDIUM

CROSS REFERENCE TO RELATED APPLICATIONS

This application is a National Stage of International Application No. PCT/JP2019/050862 filed Dec. 25, 2019.

TECHNICAL FIELD

The present invention relates to an image retrieval system, an image retrieval method, and a storage medium.

BACKGROUND ART

There is known an image inspection device that irradiates a surface of an inspection object with light from an illumination unit, receives reflected light by an imaging means, analyzes a luminance distribution of the received light, and detects a defect or the like present in the inspection object. For example, PTL 1 discloses an image inspection device that facilitates detection of a defect by generating an image decomposed into components such as specular reflection and diffuse reflection from a plurality of images captured by changing illumination.

CITATION LIST

Patent Literature

[PTL 1] JP 2018-205025 A

SUMMARY OF INVENTION

Technical Problem

Even if no defect can be verified for the inspection object at the time of inspection, the defect may occur after transportation of the inspection object or the like. Meanwhile, although PTL 1 describes that the device detects a defect from the inspection object but there is no disclosure of verifying that there has been no defect at the time of inspection when the defect occurs at a destination where the inspection object is transported.

In view of the above-described problems, an object of the present invention is to provide an image retrieval system, an image retrieval method, and a storage medium capable of easily confirming a state at the time of inspection of an object including a region of interest such as a defect.

Solution to Problem

An image retrieval system according to the present invention includes: a storage means for storing a plurality of registered images obtained by capturing a plurality of objects to be registered; an acquisition means for acquiring a retrieval image including a region of interest; an extraction means for to extracting a feature from a region other than the region of interest of the retrieval image; a retrieval means for retrieving, from the plurality of registered images stored in the storage means, a registered image having a feature that matches the feature extracted by the extraction means; and an output means for outputting some or all of the registered images retrieved by the retrieval means in a mode that a region corresponding to the region of interest in the retrieval image is recognizable.

An image retrieval method according to the present invention including: acquiring a retrieval image including a region of interest; extracting a feature from a region other than the region of interest of the retrieval image; retrieving, from a plurality of registered images obtained by capturing a plurality of objects to be registered, a registered image having a feature that matches the extracted feature; and outputting some or all of the retrieved registered images in a mode that a region corresponding to the region of interest in the retrieval image is recognizable.

A storage medium according to the present invention stores a program for causing a computer to function as: an acquisition means configured to acquire a retrieval image including a region of interest; an extraction means configured to extract a feature from a region other than the region of interest of the retrieval image; a retrieval means configured to retrieve, from a plurality of registered images obtained by capturing a plurality of objects to be registered and stored in a storage means, a registered image having a feature that matches the feature extracted by the extraction means; and an output means configured to output some or all of the registered images retrieved by the retrieval means in a mode that a region corresponding to the region of interest in the retrieval image is recognizable.

Advantageous Effects of Invention

According to the present invention, it is possible to easily confirm a state at the time of inspection of an object including a region of interest such as a defect.

BRIEF DESCRIPTION OF DRAWINGS

FIG. 16 is an example of a flowchart at the time of registration.

EXAMPLE EMBODIMENT

Hereinafter, an image retrieval system, an image retrieval method, and a storage medium will be described with reference to the drawings.

First Example Embodiment

Figure 1:
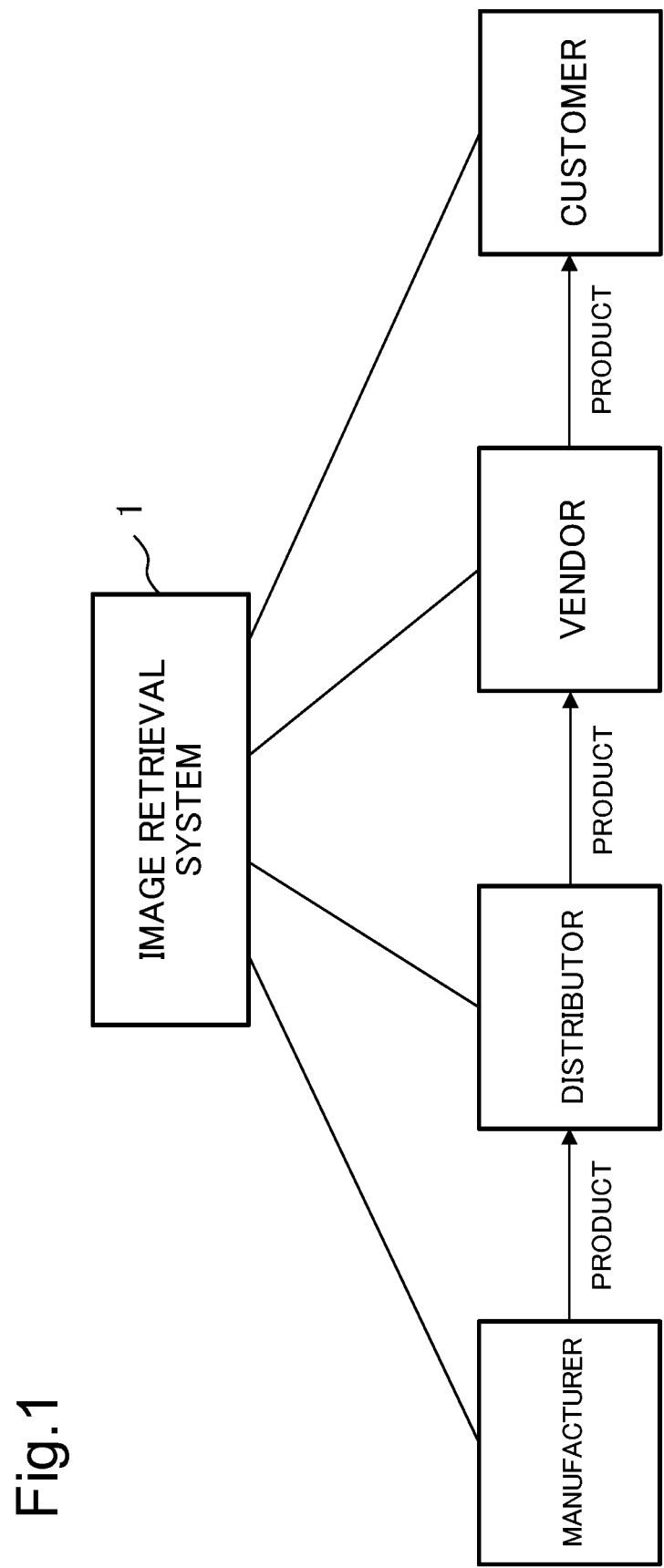
FIG. 1 is a diagram illustrating an example of a relationship among a manufacturer, a distributor, a vendor, a customer, and an image retrieval system 1 in the present invention.

FIG. 1 is a diagram illustrating an example of a relationship among a manufacturer, a distributor, a vendor, a customer, and an image retrieval system 1. FIG. 1 is an example illustrating that each of the manufacturer, the distributor, the vendor, and the customer uses the image retrieval system when products are distributed in the aforementioned order. However, the present example embodiment is not limited to the use mode of the image retrieval system illustrated in FIG. 1, and for example, only the manufacturer and the customer may use the image retrieval system. Further, the manufacturer may be subdivided into a component manufacturer and a finished product manufacturer. At that time, a distributor may be added between the component manufacturer and the finished product manufacturer, and components are distributed as products from the component manufacturer to the finished product manufacturer.

Figure 2:
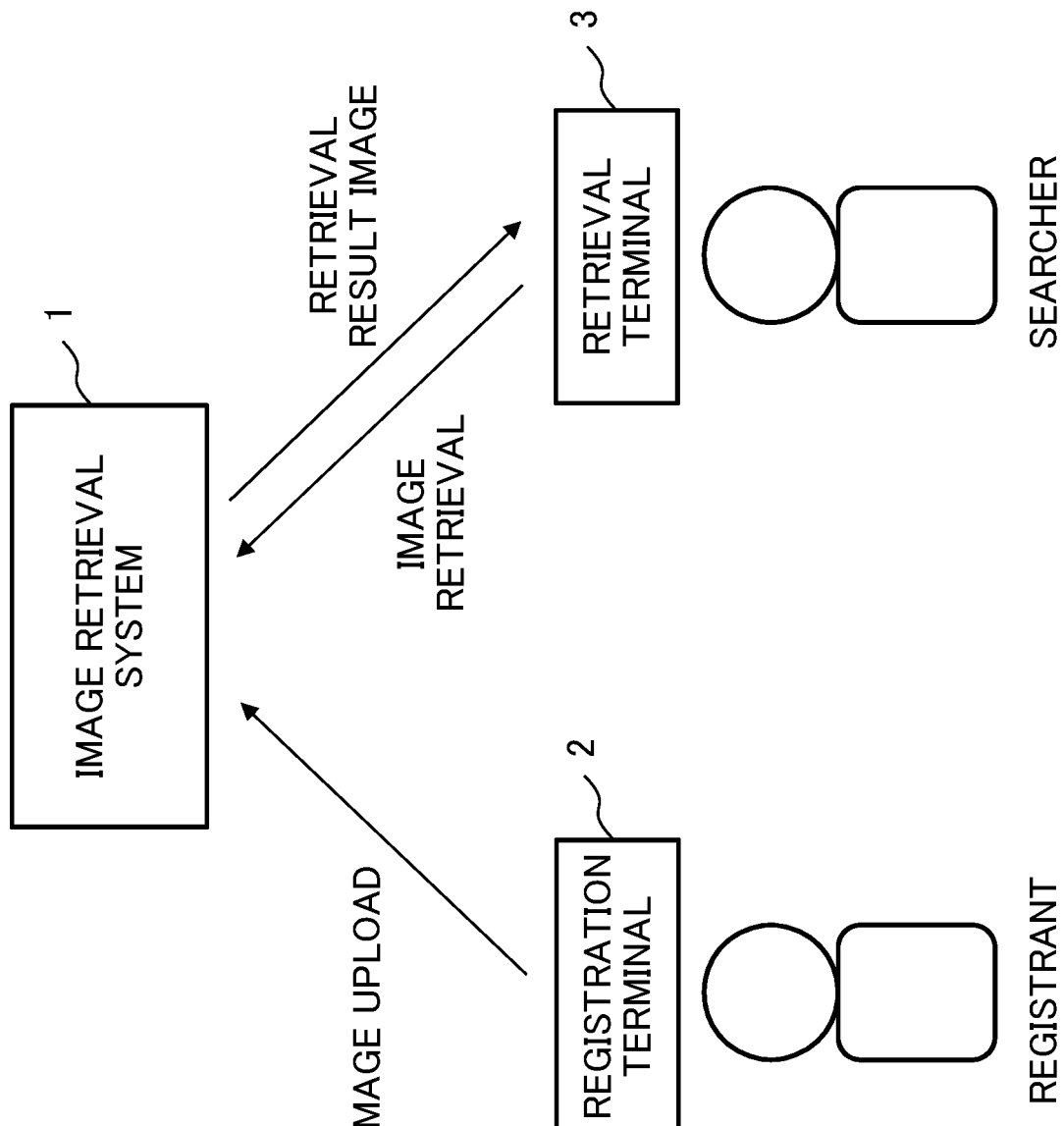
FIG. 2 is a diagram illustrating an example of actions performed by a registrant and a searcher in the present invention.

FIG. 2 is a diagram illustrating an example of actions performed by a registrant and a searcher. The registrant is the finished product manufacturer, the component manufacturer, the distributor, the vendor, or the like. The registrant uploads an image of the product to the image retrieval system 1 using the registration terminal 2. The searcher is the finished product manufacturer, the distributor, the vendor, the customer, or the like. The searcher accesses the image retrieval system 1 using the retrieval terminal 3 and performs image retrieval. The image retrieval system 1 outputs a retrieval result image to the retrieval terminal 3.

Figure 3:
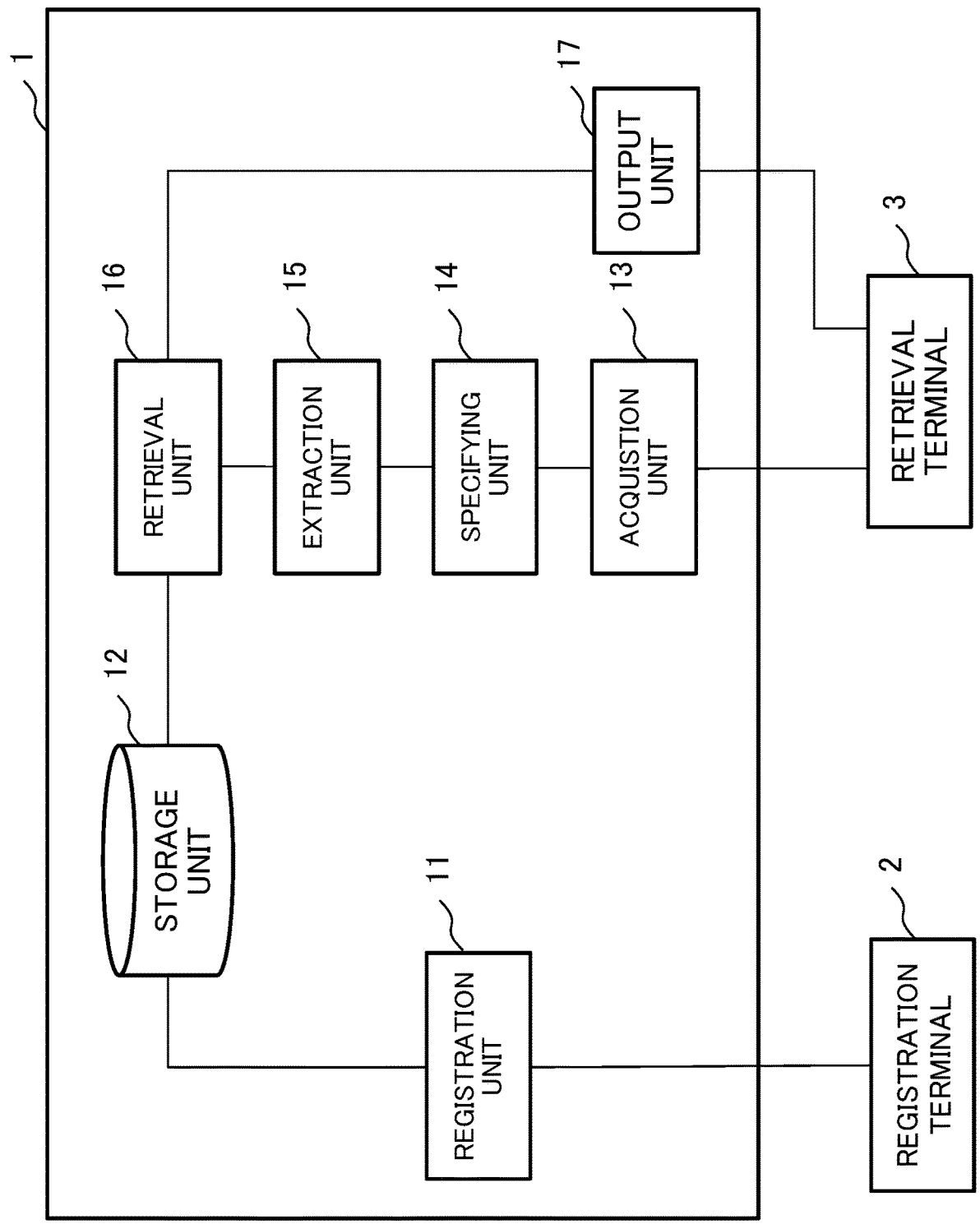
FIG. 3 is an example of functional blocks of an image retrieval system according to a first example embodiment.

FIG. 3 is an example of functional blocks of the image retrieval system according to the present example embodiment. As illustrated in FIG. 3, the image retrieval system 1 includes a registration unit 11, a storage unit 12, an acquisition unit 13, a specifying unit 14, an extraction unit 15, a retrieval unit 16, and an output unit 17. The registration terminal 2 is connected to the registration unit 11 of the image retrieval system 1. The retrieval terminal 3 is connected to the acquisition unit 13 and the output unit 17 of the image retrieval system 1.

Hereinafter, each functional block constituting the image retrieval system 1 will be described in detail with reference to FIG. 4A and subsequent drawings in addition to FIG. 3.

The registration unit 11 acquires, from the registration terminal 2, registered images 101 obtained by imaging a plurality of objects to be registered and information related to the objects to be registered. Then, the registration unit 11 extracts a feature from each image of the object to be registered. Then, the registration unit 11 registers the each image and the information related to the feature in the storage unit 12 in association with each other. Note that the registration unit 11 favorably divides the registered image 101 into partial regions, and extracts and registers the feature from each partial region.

The object to be registered is, for example, an industrial product manufactured by the manufacturer or the like. The objects to be registered may be any tangible objects, and include leather products such as bags, food items such as boxed lunches, and pharmaceuticals such as tablets.

The registered image 101 is an image obtained by capturing the object to be registered. The registered image 101 may be an image of the entire object to be registered or an image of a part of the object to be registered. Further, the registered images 101 may be a plurality of images obtained by capturing the same object. For example, the registered images 101 may be a plurality of images each captured for each part of the same object to be registered or for each different capture direction. Further, the registered image 101 may be a moving image. For example, the registered images 101 may be a plurality of still images or moving images obtained by capturing the same portion from a plurality of illumination directions. Note that the registered image 101 favorably has a resolution at which the feature can be extracted.

The information related to the object to be registered is, for example, information of the registrant (affiliation, name, and the like of the registrant), registration date and time, production date, registration place, manufacturing place, quality information (inspection result and the like), classification in the distribution process (distributor, vendor, and the like), manufacturing number, lot number, information of captured position of the object to be registered, information of the related registered image 101, and the like. For example, in a case where a plurality of images is captured with respect to the same object to be registered, the information related to the object to be registered includes information by which each image having been obtained by capturing the same object to be registered is recognizable, and desirably includes information of the captured position (front surface, back surface, side surface, or the like) of the object to be registered. Further, for example, in a case where a target object registered by the manufacturer is registered again by the vendor or the like, the information related to the object to be registered favorably includes information by which the same object to be registered having been captured is recognizable as the feature of the registered image 101 matches.

Figure 4A:
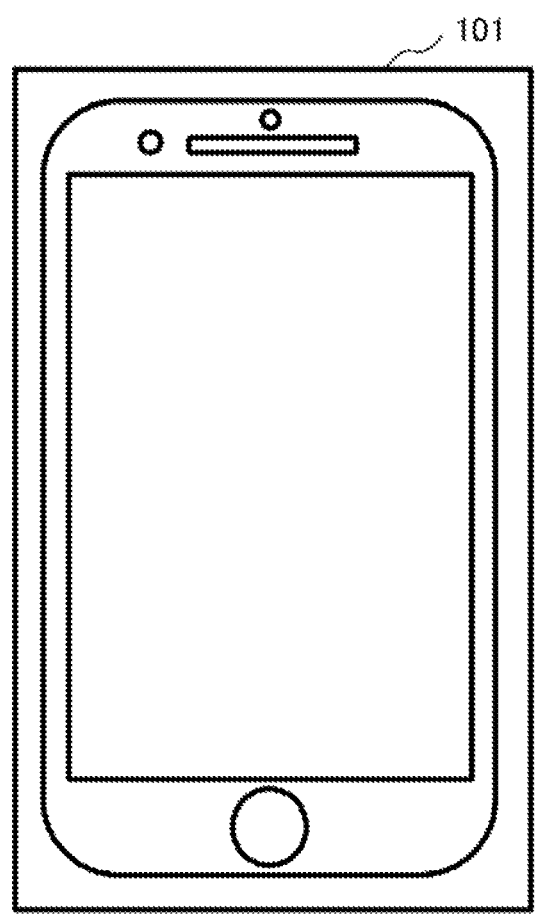
FIG. 4A is an example of images registered by a registrant.
Figure 4B:
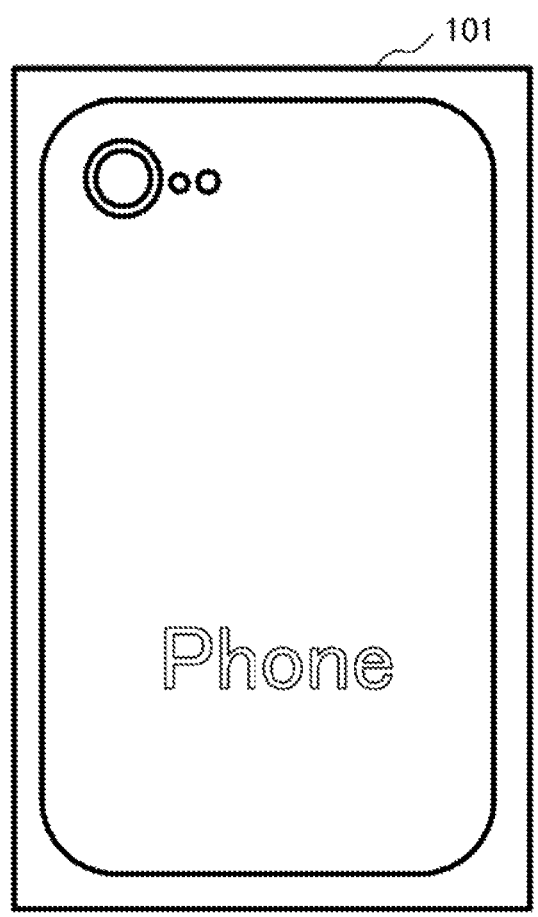
FIG. 4B is an example of images registered by a registrant.

FIGS. 4A and 4B are examples of the registered images 101 registered by the registrant. FIG. 4A is an image obtained by capturing an entire front surface of a smartphone that is an object to be registered. FIG. 4B is an image obtained by capturing an entire back surface of the smartphone that is an object to be registered.

The storage unit 12 stores the registered image 101 registered by the registration unit 11, the feature extracted from the registered image 101, and the information related to the object to be registered in association with each other.

The acquisition unit 13 acquires a retrieval image 102 including a region of interest from the retrieval terminal 3. The acquisition unit 13 outputs the acquired retrieval image 102 to the specifying unit 14. Moreover, the acquisition unit 13 may acquire information regarding the region of interest of the retrieval image 102. In the case of acquiring the information regarding the region of interest of the retrieval image 102, the acquisition unit 13 outputs the information regarding the region of interest to the specifying unit 14.

The retrieval image 102 is an image obtained by capturing an object to be retrieved. The retrieval image 102 may be an image of the entire object to be retrieved or an image of a part of the object to be retrieved. Further, the number of retrieval images 102 may be plural. For example, the retrieval images 102 may be images obtained by capturing the same portion in different illumination conditions, where one image is captured at an illumination angle at which the region of interest is easily recognizable, and the other image is captured at an illumination angle at which the feature is easily extractable. Further, the retrieval image 102 may be a moving image. For example, the retrieval images 102 may be moving images obtained by capturing the same portion from a plurality of illumination directions. Note that the retrieval image 102 favorably has a resolution at which the feature can be extracted.

The region of interest is a region attracting attention in the retrieval image 102. For example, the region of interest is a region including a flaw of the retrieval image 102 obtained by capturing a defect such as a flaw on the product surface. Further, for example, the region of interest is a region including an insect in the retrieval image 102 obtained by capturing a lunch box containing the insect.

The information regarding the region of interest is information for designating the region of interest in the retrieval image 102. For example, the information regarding the region of interest is information obtained by the searcher designating a range while viewing the retrieval image 102 using the retrieval terminal 3. For example, the information regarding the region of interest is information input by the searcher tracing an outer periphery of the region of interest of the retrieval image 102 displayed on a touch panel using the retrieval terminal 3.

FIG. 5 is an example of the retrieval images 102 used by the searcher. FIG. 5(*a*) is an image obtained by capturing an entire back surface of a smartphone that is an object to be retrieved. FIG. 5(*b*) is an image obtained by capturing a part of the back surface of the smartphone that is the object to be retrieved.

Figure 5A:
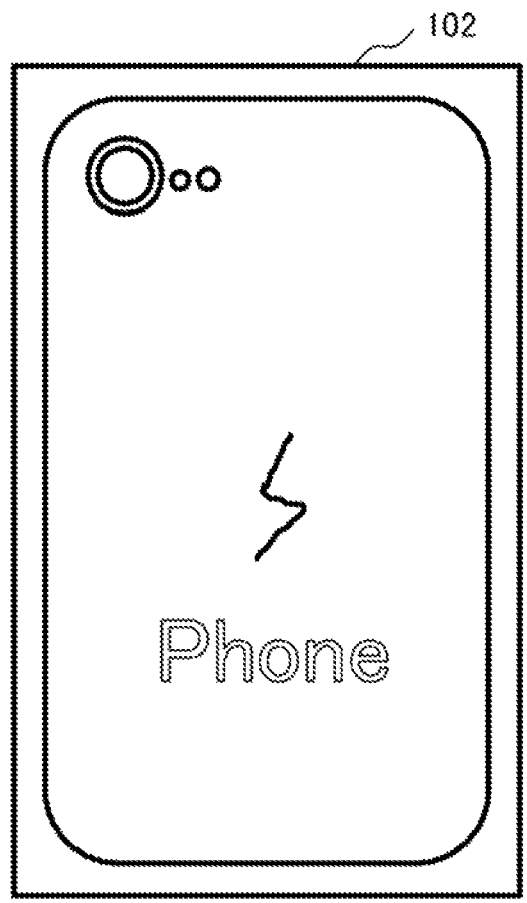
FIG. 5A is an example of images used by a searcher for retrieval
Figure 5B:
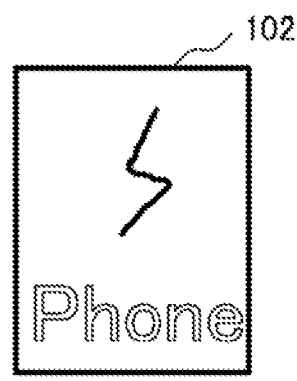
FIG. 5B is an example of images used by a searcher for retrieval.

FIGS. 5A and 5B are examples of the retrieval images 102 used by the searcher. FIG. 5A is an image obtained by capturing an entire back surface of a smartphone that is an object to be retrieved. FIG. 5B is an image obtained by capturing a part of the back surface of the smartphone that is the object to be retrieved.

Figure 6A:
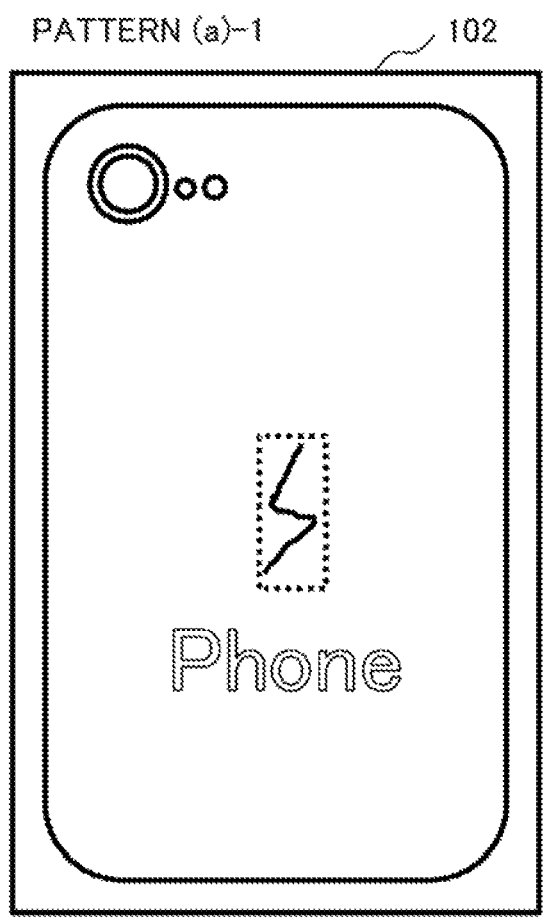
FIG. 6A is examples of a region of interest.
Figure 6B:
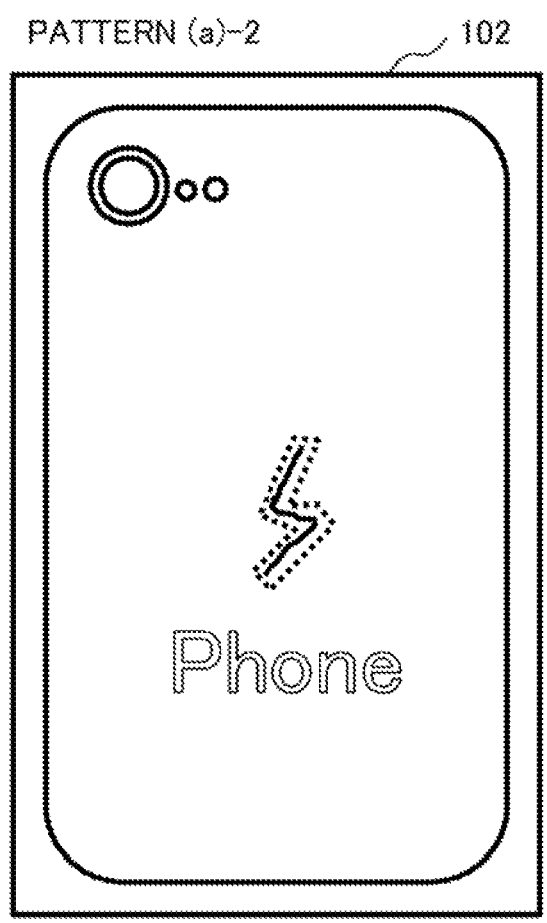
FIG. 6B is examples of a region of interest.
Figure 7A:
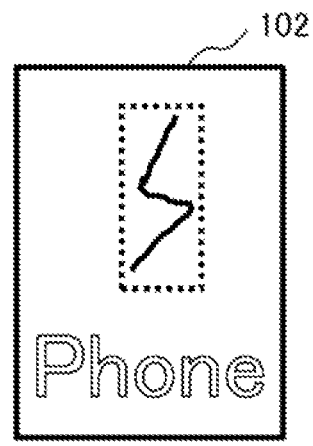
FIG. 7A is examples of the region of interest.
Figure 7B:
FIG. 7B is examples of the region of interest.

FIGS. 6A, 6B, 7A and 7B are examples of the region of interest. For example, the searcher may designate the region of interest with a quadrangle including the region of interest as illustrated in FIG. 6A. For example, the searcher may designate the region of interest in accordance with the shape of the region of interest as illustrated in FIG. 6B. FIG. 7A and FIG. 7B illustrate that the region of interest can be designated similarly to FIG. 6A and FIG. 6B even if the retrieval images 102 are captured images of a part of the object to be retrieved.

The specifying unit 14 specifies the region of interest of the retrieval image 102 acquired by the acquisition unit 13. In a case where the acquisition unit 13 has acquired the information regarding the region of interest, the specifying unit 14 specifies the region of interest on the basis of the information regarding the region of interest. In a case where the acquisition unit 13 has not acquired the information regarding the region of interest, the specifying unit 14 specifies the region of interest on the basis of the retrieval image 102 acquired by the acquisition unit 13. For example, the specifying unit 14 divides the retrieval image 102 into partial regions, and specifies the region of interest by specifying the presence or absence of a defect (a flaw or the like) in each of the divided partial regions. The specifying unit 14 uses, for example, a neural network that has learned features of the defect to specify the presence or absence of the defect in each partial region. In addition, for example, the specifying unit 14 may cause a model to learn the feature of a partial region without a defect to create a normal model, and specify a partial region deviating from the normal model as a defect. The specifying unit 14 outputs the specified region of interest to the extraction unit 15.

The extraction unit 15 extracts the feature from a region other than the region of interest specified by the specifying unit 14 in the retrieval image 102. The region from which the feature has been extracted (hereinafter referred to as a feature extraction region) may be any region of the surface of the target object as long as the registered image is stored for the region in the storage unit 12. For example, in a case where the size of each partial region divided by the specifying unit 14 is sufficient for extracting the feature even if the region of interest is excluded, the extraction unit 15 may extract the feature from a region other than the region of interest among the partial regions specified as having a defect by the specifying unit 14. For example, in a case where the size of each partial region divided by the specifying unit 14 is not sufficient for extracting the feature if the region of interest is excluded, the extraction unit 15 may extract the feature from a partial region adjacent to the partial region specified as having a defect by the specifying unit 14. Further, in a case where the retrieval images 102 include the image captured at an illumination angle at which the region of interest is easily recognizable and the image captured at an illumination angle at which the feature is easily extractable, the extraction unit 15 sets a portion same as the region of interest in the image captured at an illumination angle at which the region of interest is easily recognizable as the region of interest in the image captured at an illumination angle at which the feature is easily extractable, and extracts the feature from the region other than the region of interest. The extraction unit 15 outputs the extracted feature to the retrieval unit 16.

The feature extracted by the extraction unit 15 is, for example, a frequency feature obtained by performing two-dimensional discrete Fourier transform for the feature extraction region. Further, the feature may be a luminance gradient of the feature extraction region, a binary feature based on a magnitude relationship of pixels of the feature extraction region, an output result obtained by inputting an image of the feature extraction region to a neural network learned in advance, or the like.

Figure 8A:
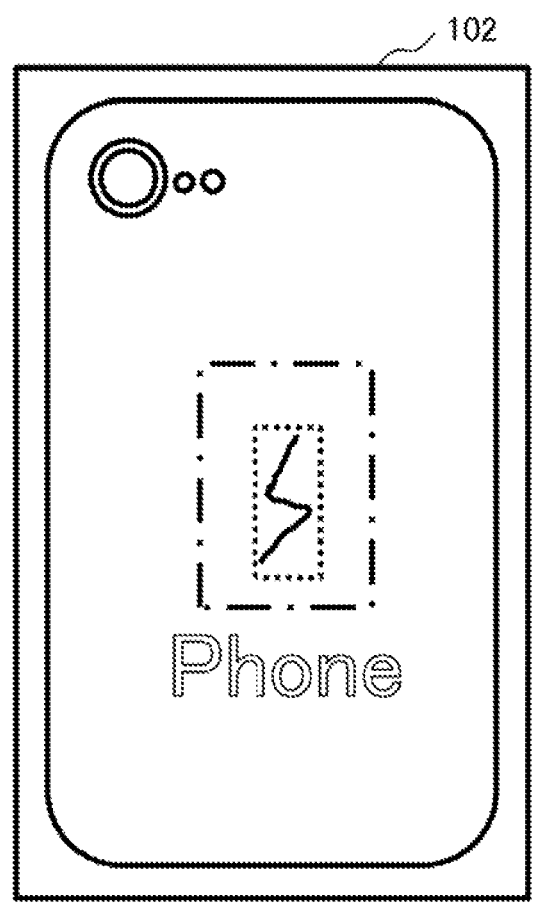
FIG. 8A is examples of a feature extraction region.
Figure 8B:
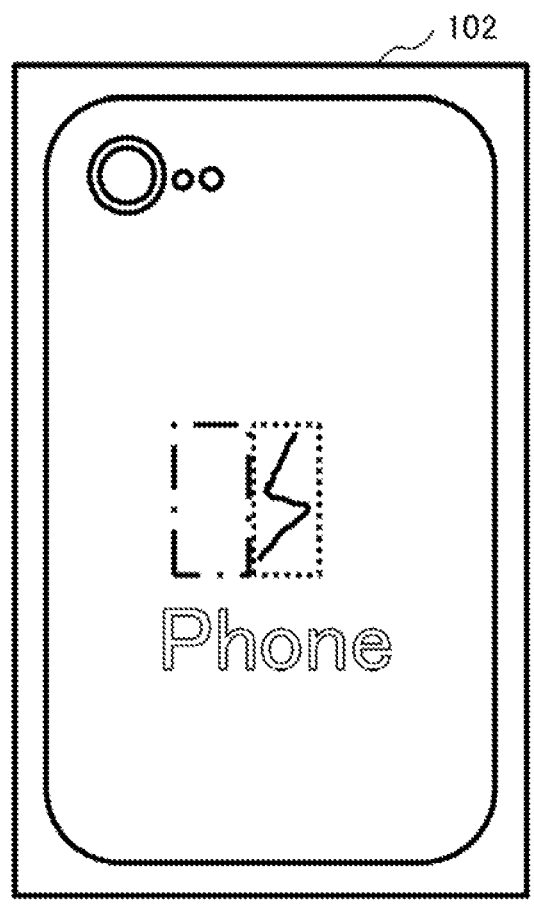
FIG. 8B is examples of a feature extraction region.

FIGS. 8A and 8B are examples of a feature extraction region. In FIG. 8A, a region excluding a region surrounded by the dotted line that is the region of interest, in a region surrounded by the one-dot chain line, is the feature extraction region. The extraction unit 15 may extract the feature from the region other than the region of interest, in the region surrounded by the one-dot chain line including the region of interest. In FIG. 8B, a region surrounded by the one-dot chain line is the feature extraction region. The feature extraction region is favorably a vertically or horizontally adjacent region. The extraction unit 15 may extract the feature from the region surrounded by the one-dot chain line adjacent to the region of interest. Note that the feature extraction region may not be adjacent to the region of interest as long as the positional relationship with the region of interest is known.

Figure 9A:
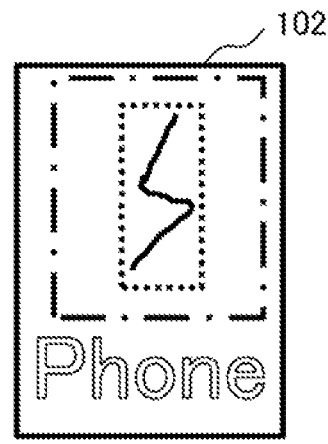
FIG. 9A is examples of the feature extraction region.
Figure 9B:
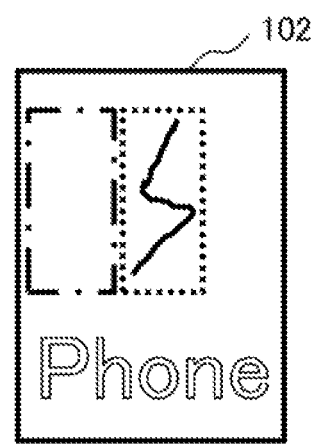

FIGS. 9(A) and 9(B) illustrate that the feature extraction region can be determined similarly to FIGS. 8(A) and 8(B) even if the retrieval image 102 is a captured image of a part of the object to be retrieved. FIG. 9(A) illustrates a captured image of a part of the object illustrated in FIG. 8(A). FIG. 9(B) illustrates a captured image of a part of the object illustrated in FIG. 8(B).

The retrieval unit 16 retrieves, from the storage unit 12, the registered image 101 having a feature that matches the feature extracted by the extraction unit 15. For example, in a case where the registered image 101 and the feature from the registered image 101 are stored in the storage unit 12 in association with each other, the retrieval unit 16 retrieves, from the storage unit 12, the registered image associated with the feature that matches the feature extracted by the extraction unit 15. The retrieval unit 16 outputs a retrieval result to the output unit 17.

The output unit 17 outputs, to the retrieval terminal 3, some or all of the registered images 101 retrieved by the retrieval unit 16 in a mode that a region corresponding to the region of interest of the retrieval image 102 is recognizable.

Figure 10A:
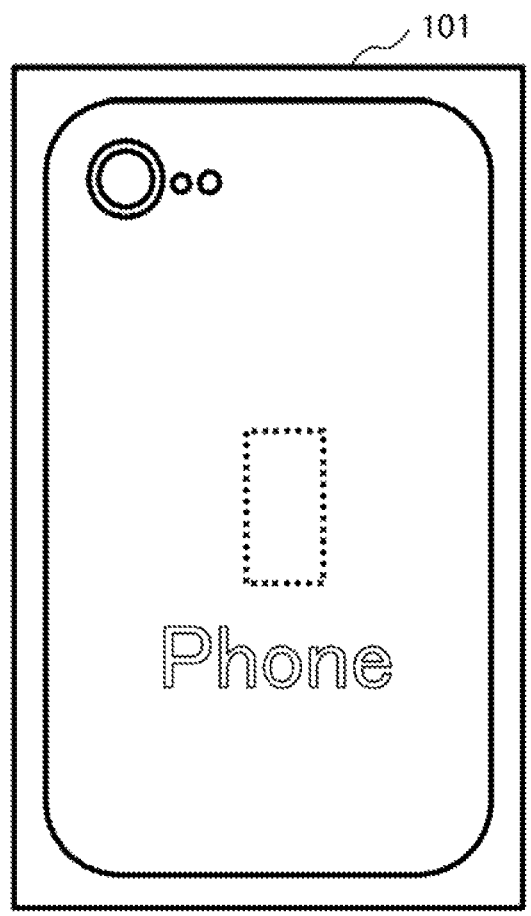
FIG. 10A is examples in which an output unit superimposes and outputs images.
Figure 10B:
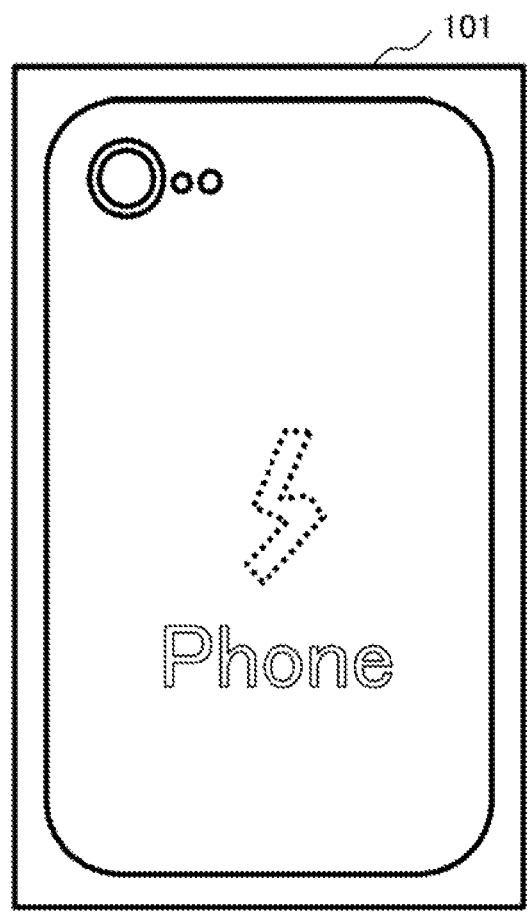
FIG. 10B is examples in which an output unit superimposes and outputs images.

FIGS. 10A and 10B are examples in which the output unit 17 superimposes and outputs images. The output unit 17 may superimpose and output an image in which the region corresponding to the region of interest of the retrieval image 102 is recognizable. The output registered image 101 may be an image obtained by cutting out a part of the registered image 101 obtained by capturing the entire target object or may be the registered image 101 obtained by capturing a part of the target object as long as the region corresponding to the region of interest of the retrieval image 102 is included. By superimposing the image in which the region corresponding to the region of interest of the retrieval image 102 is recognizable, the searcher can visually understand the region of the registered image 101 corresponding to the region that has been the region of interest in the retrieval image 102, and can confirm what the corresponding region was like at the time of registration.

Figure 11A:
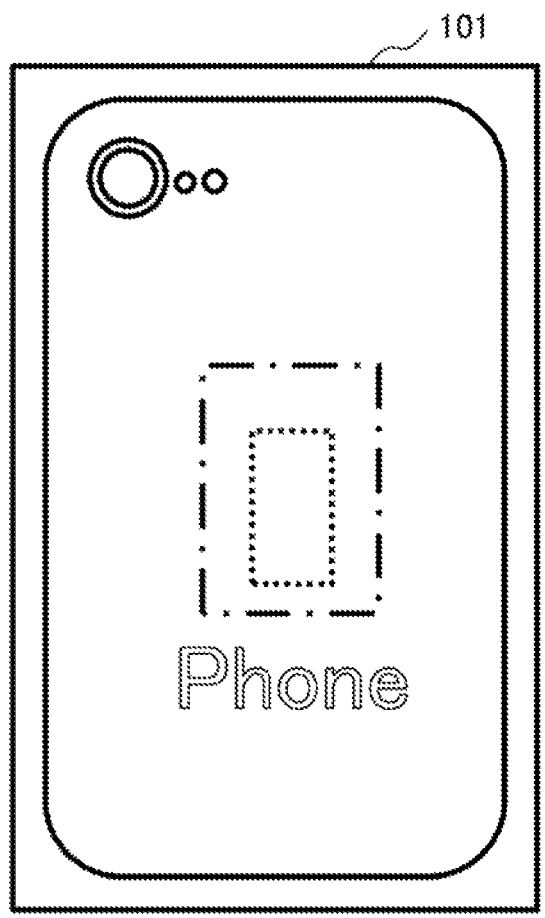
FIG. 11A is examples in which the output unit superimposes and outputs images.
Figure 11B:
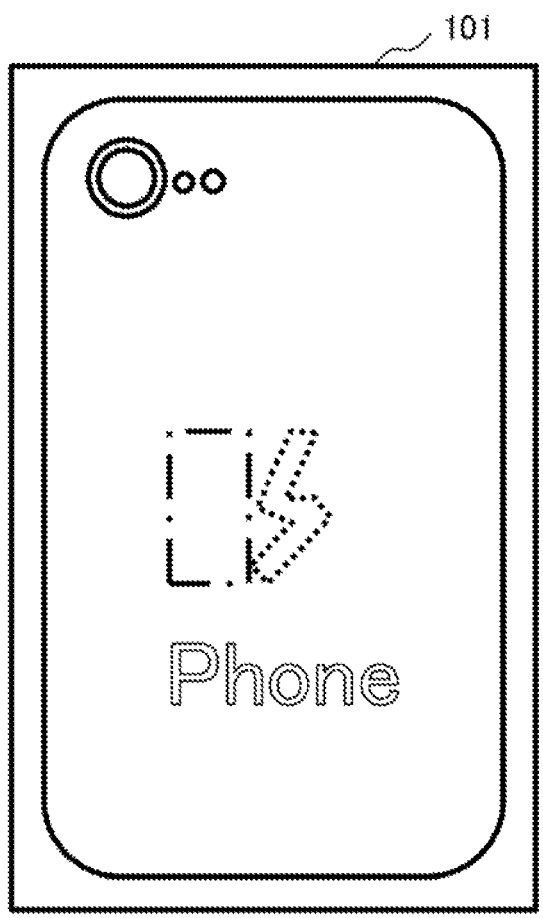
FIG. 11B is examples in which the output unit superimposes and outputs images.

FIGS. 11A and 11B are examples in which the output unit 17 superimposes and outputs images. The output unit 17 may superimpose and output an image in which the feature extraction region of the retrieval image 102 is recognizable. The output registered image 101 may be an image obtained by cutting out a part of the registered image 101 obtained by capturing the entire target object or may be the registered image 101 obtained by capturing a part of the target object as long as the region corresponding to the region of interest of the retrieval image 102 and the feature extraction region are included. By superimposing the image in which the feature extraction region of the retrieval image 102 is recognizable, the searcher can visually understand and confirm the region of the registered image 101 corresponding to the feature extraction region in the retrieval image 102.

Figure 12:
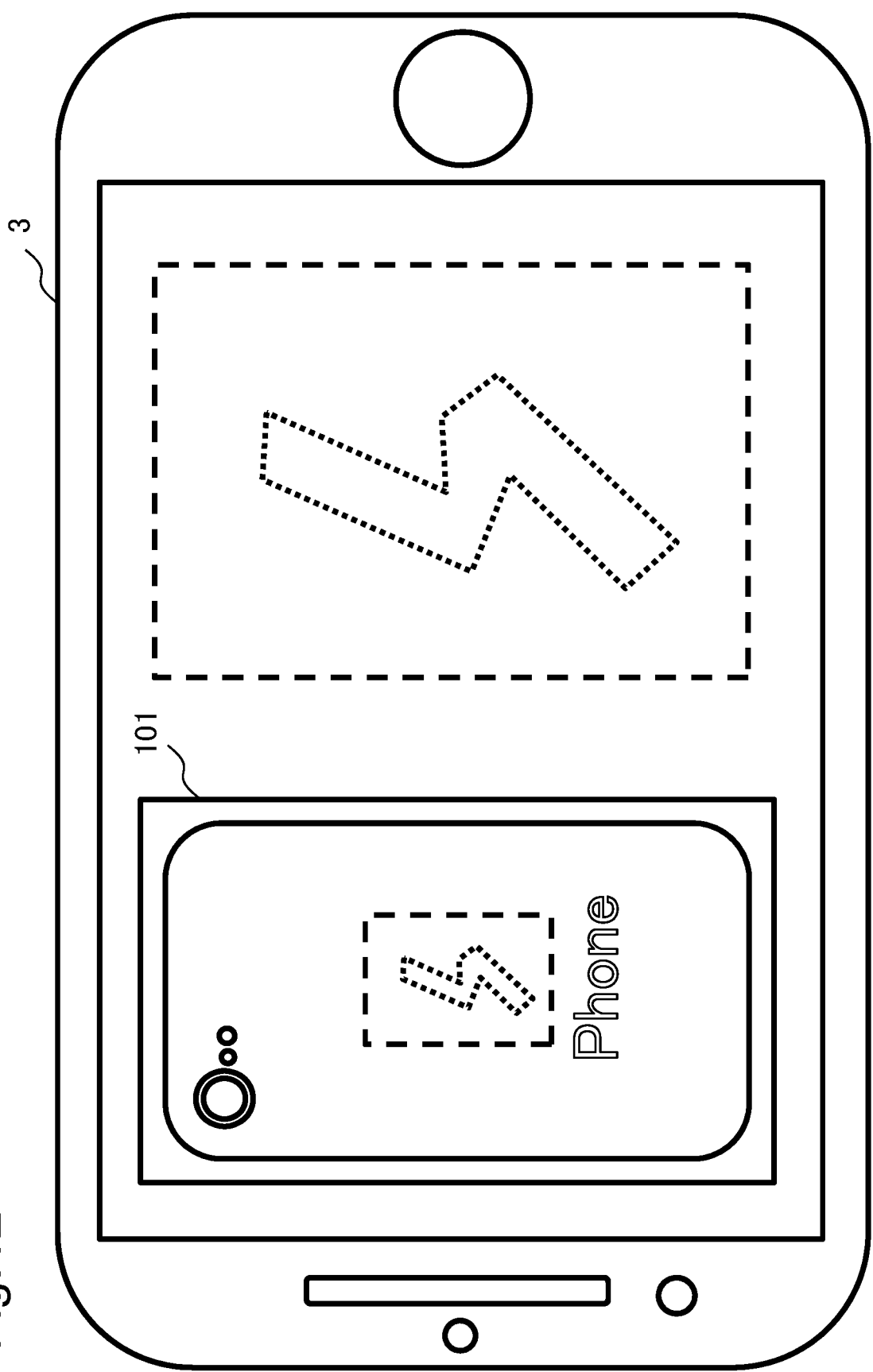
FIG. 12 is an example in which the output unit outputs an enlarged image.

FIG. 12 is an example in which the output unit 17 outputs an enlarged image. The output unit 17 may output the registered image 101 retrieved by the retrieval unit 16 and an enlarged image of the region corresponding to the region of interest of the retrieval image 102, in the registered image 101 retrieved by the retrieval unit 16. As a result, the searcher can confirm in detail what the corresponding region was like at the time of registration.

Figure 13:
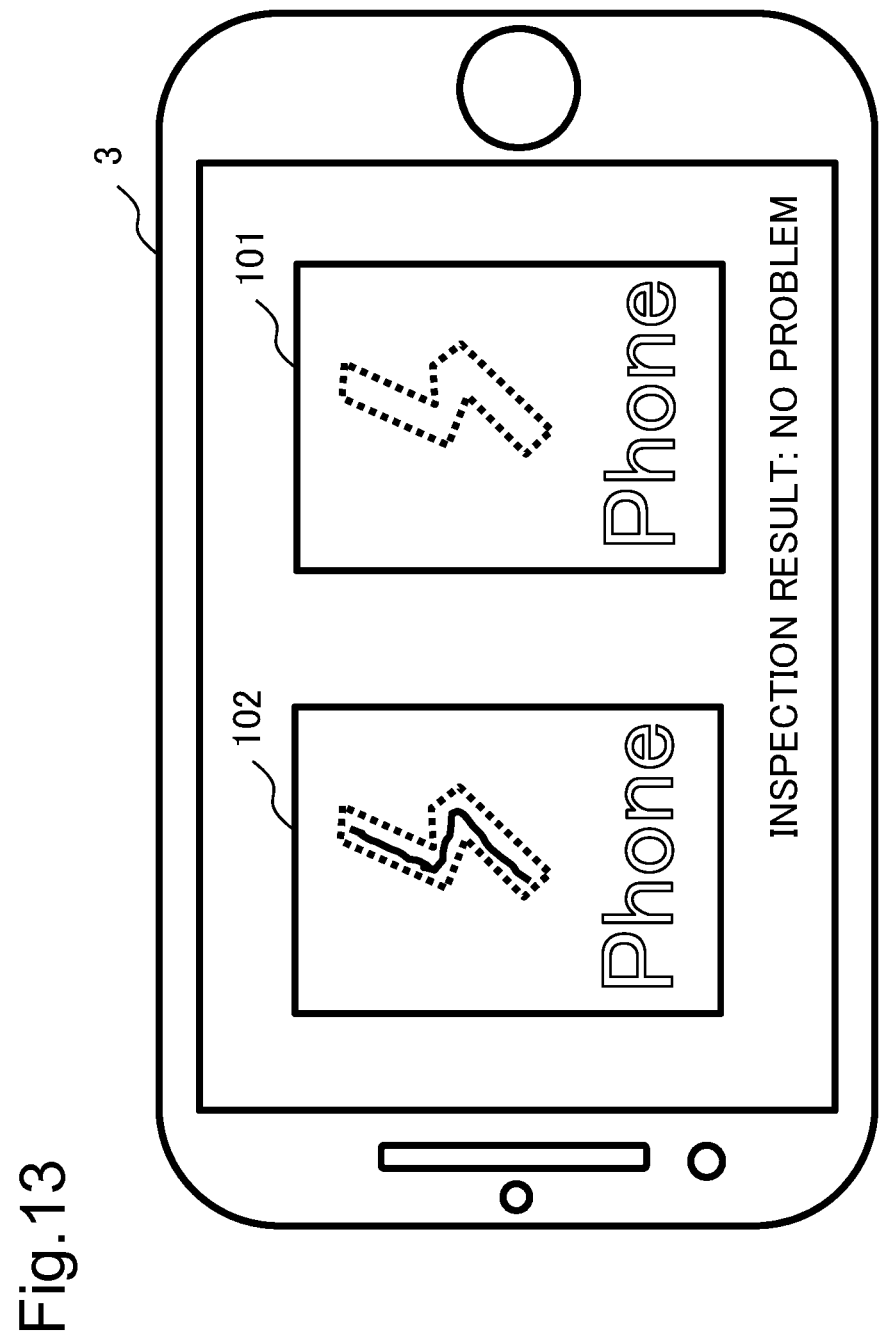
FIG. 13 is an example in which the output unit outputs two images in a comparable mode.

FIG. 13 is an example in which the output unit 17 outputs two images in a comparable mode. The output unit 17 may output some or all of the registered images 101 including the region corresponding to the region of interest of the retrieval image 102 and the retrieval image 102. The registered image 101 and the retrieval image 102 in FIG. 13 may include a part or an entire object of the target object. As some or all of the registered images 101 including the region corresponding to the region of interest of the retrieval image 102 and the retrieval image 102 are output, the searcher can compare the region of the registered image 101 corresponding to the region of the retrieval image 102 with the region of interest of the retrieval image 102 on one screen.

Furthermore, FIG. 13 is an example of outputting an inspection result that is information associated with the registered image 101. The output unit 17 may further output the information associated with the registered image 101 retrieved by the retrieval unit 16. As a result, the searcher can confirm the information related to the registered image 101.

Figure 14:
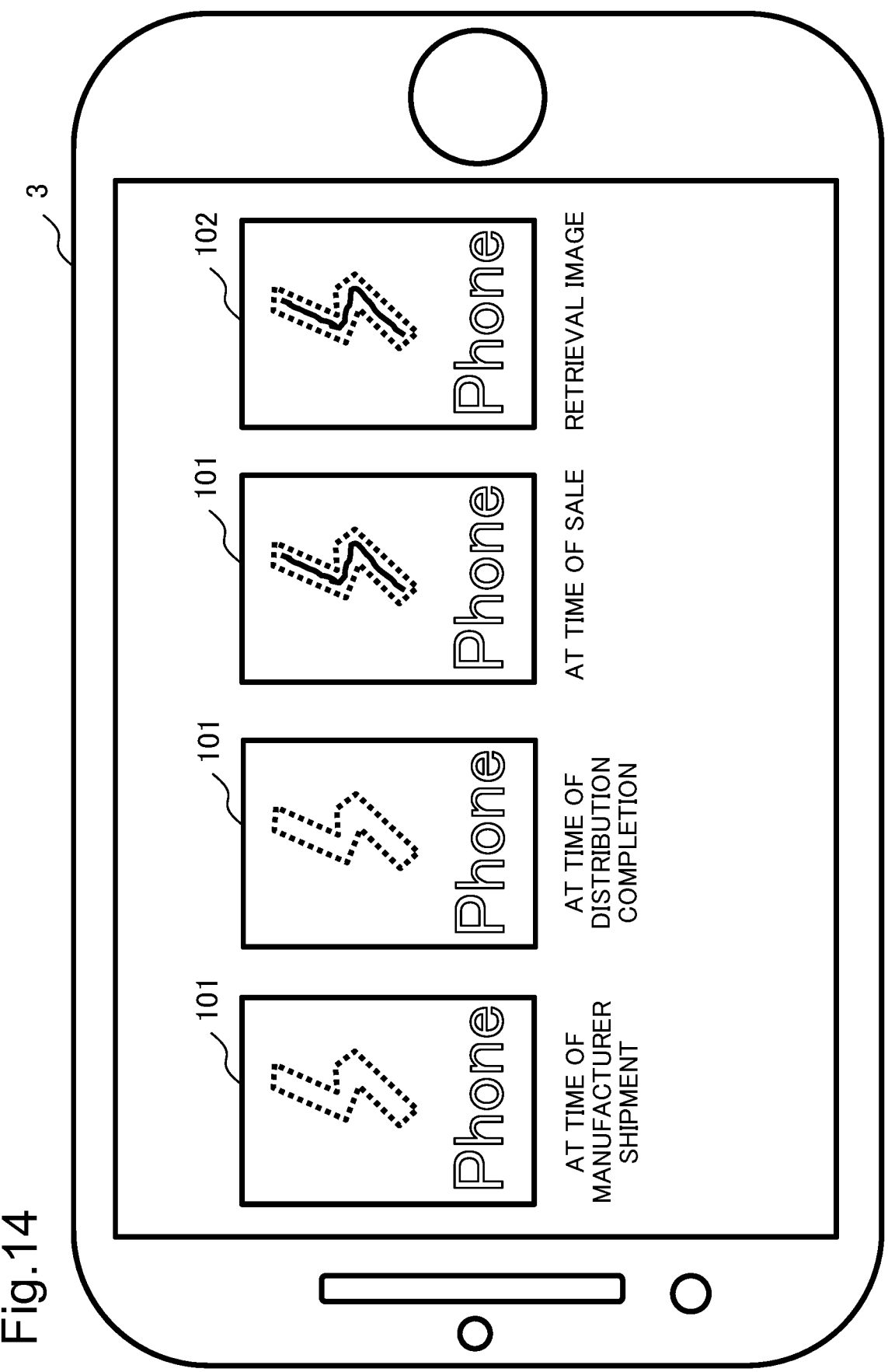
FIG. 14 is an example in which the output unit outputs an image registered at each distribution timing of a product.

FIG. 14 is an example in which the output unit 17 outputs an image registered at each distribution timing of a product. In a case where the registered image 101 retrieved by the retrieval unit 16 is registered by each of the manufacturer, the distributor, and the vendor illustrated in FIG. 1, the output unit 17 may further output information associated with some or all of the plurality of registered images 101. Note that each distribution timing is not limited to the example illustrated in FIG. 1. By further outputting the information associated with some or all of the plurality of registered images 101, the searcher can confirm what the region of interest of the target article was like at each distribution timing. Moreover, the searcher can confirm at which timing of each distribution timing the defect has occurred. In addition, in a case where the product is registered at each distribution timing, the searcher can investigate a cause and a factor of occurrence of the defect.

Figure 15A:
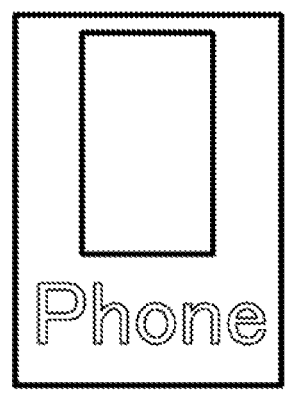
FIG. 15A is examples of display modes of the region of interest and the feature extraction region.
Figure 15B:
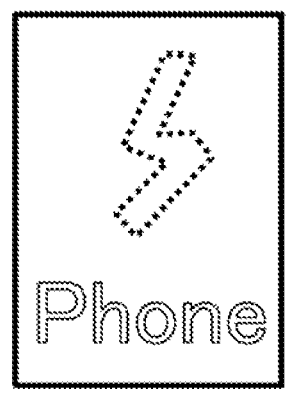
FIG. 15B is examples of display modes of the region of interest and the feature extraction region.
Figure 15C:
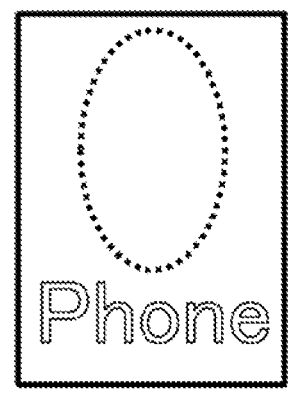
FIG. 15C is examples of display modes of the region of interest and the feature extraction region.
Figure 15D:
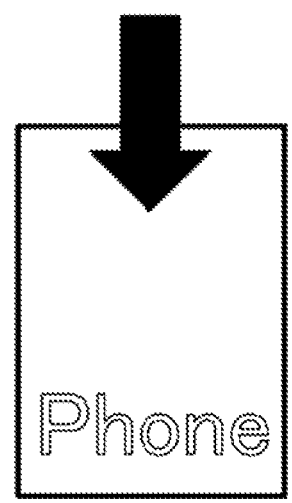
FIG. 15D is examples of display modes of the region of interest and the feature extraction region.

FIGS. 15A, 15B, 15C and 15B are examples of display modes of the region of interest and the feature extraction region. The region of interest and the feature extraction region superimposed and displayed on the registered image 101 and the retrieval image 102 may be recognized in the modes illustrated in FIGS. 15A, 15B, 15C and 15D, for example. The display mode of the region of interest and the feature extraction region may be a dotted line, a one-dot chain line, or a solid line, and is not limited to the display mode in FIG. 15. Further, the region of interest and the feature extraction region may be displayed in different colors.

FIG. 16 is an example of a flowchart at the time of registration.

First, the registration unit 11 acquires the registered images 101 obtained by capturing the plurality of objects to be registered and the information related to the objects to be registered from the registration terminal 2 (step S102).

Next, the registration unit 11 extracts the feature from the registered image 101 of each object to be registered (step S104).

Then, the registration unit 11 registers each registered image 101 and the information related to the feature in the storage unit 12 in association with each other (step S106).

Figure 17:
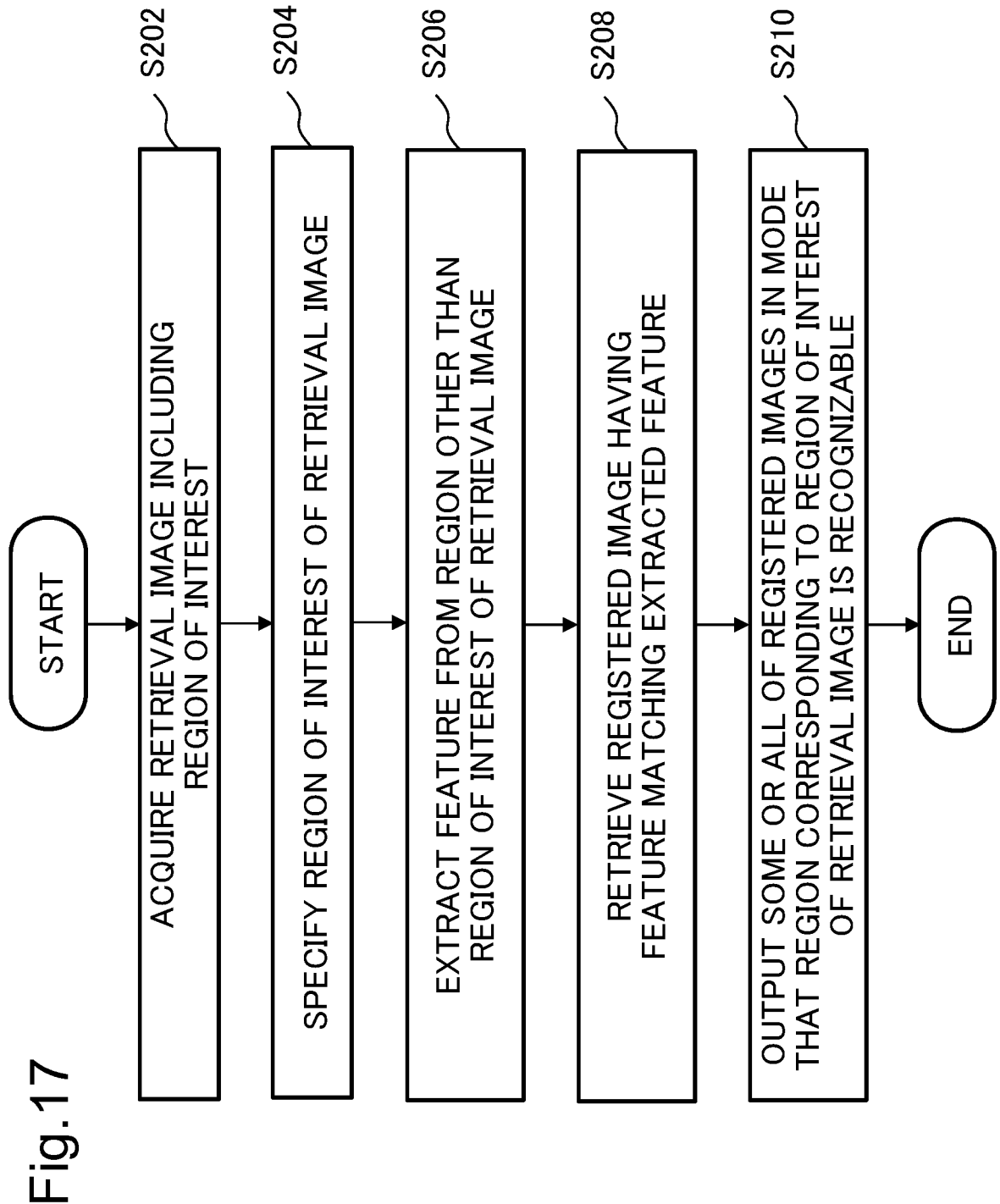
FIG. 17 is an example of a flowchart at the time of retrieval.

FIG. 17 is an example of a flowchart at the time of retrieval.

First, the acquisition unit 13 acquires the retrieval image 102 including the region of interest from the retrieval terminal 3 (step S202).

Next, the specifying unit 14 specifies the region of interest of the retrieval image 102 (step S204).

Next, the extraction unit 15 extracts the feature from a region other than the region of interest in the retrieval image 102 (step S206).

Next, the retrieval unit 16 retrieves the registered image 101 having a feature matching the extracted feature (step S208).

Then, the output unit 17 outputs, to the retrieval terminal 3, some or all of the registered images 101 in a mode that a region corresponding to the region of interest of the retrieval image 102 is recognizable (step S210).

As described above, according to the first example embodiment, the image retrieval system 1 can easily confirm the state at the time of inspection of the object including the region of interest such as a defect. Thereby, by registering the image of the target object, the registrant can verify that the defect was not present at the time of registration when the searcher performs retrieval using the target object including the defect In addition, the searcher can suitably confirm the region of the registered image corresponding to the region of interest. Moreover, the searcher can confirm the information related to the target object.

Moreover, according to the first example embodiment, for example, in a case where the manufacturer performs an appearance inspection at the time of shipment, the image retrieval system 1 can verify that there is no scratch, dent, or the like in the surface of the product at the time of shipment. Therefore, even in a case where a scratch or the like occurs in the product by an intermediary logistics company, retailer, or the like in the process until the product reaches the consumer, the manufacturer can verify that there was no defect at the time of shipment. In addition, the image retrieval system 1 can verify that there was no defect even in a case where a malicious person digitally processes an image of the appearance of the product to make the product appear to have a defect, and tries to cause harmful reputations to the manufacturer.

Although the first example embodiment has been described using an industrial product as the object to be registered, the object to be registered may be a part or the entire infrastructure such as a road or a tunnel. The image retrieval system 1 enables easy retrieval of an image to know a difference from previous registration even in a case of detecting a crack in an infrastructure such as a road or a tunnel. For example, at the time of occurrence of an accident on an inspected road, the image retrieval system 1 can display a proof that the previous inspection was performed at the place where the accident has occurred, or a state (image) at the time of the inspection.

<Modification of First Example Embodiment>

Figure 18:
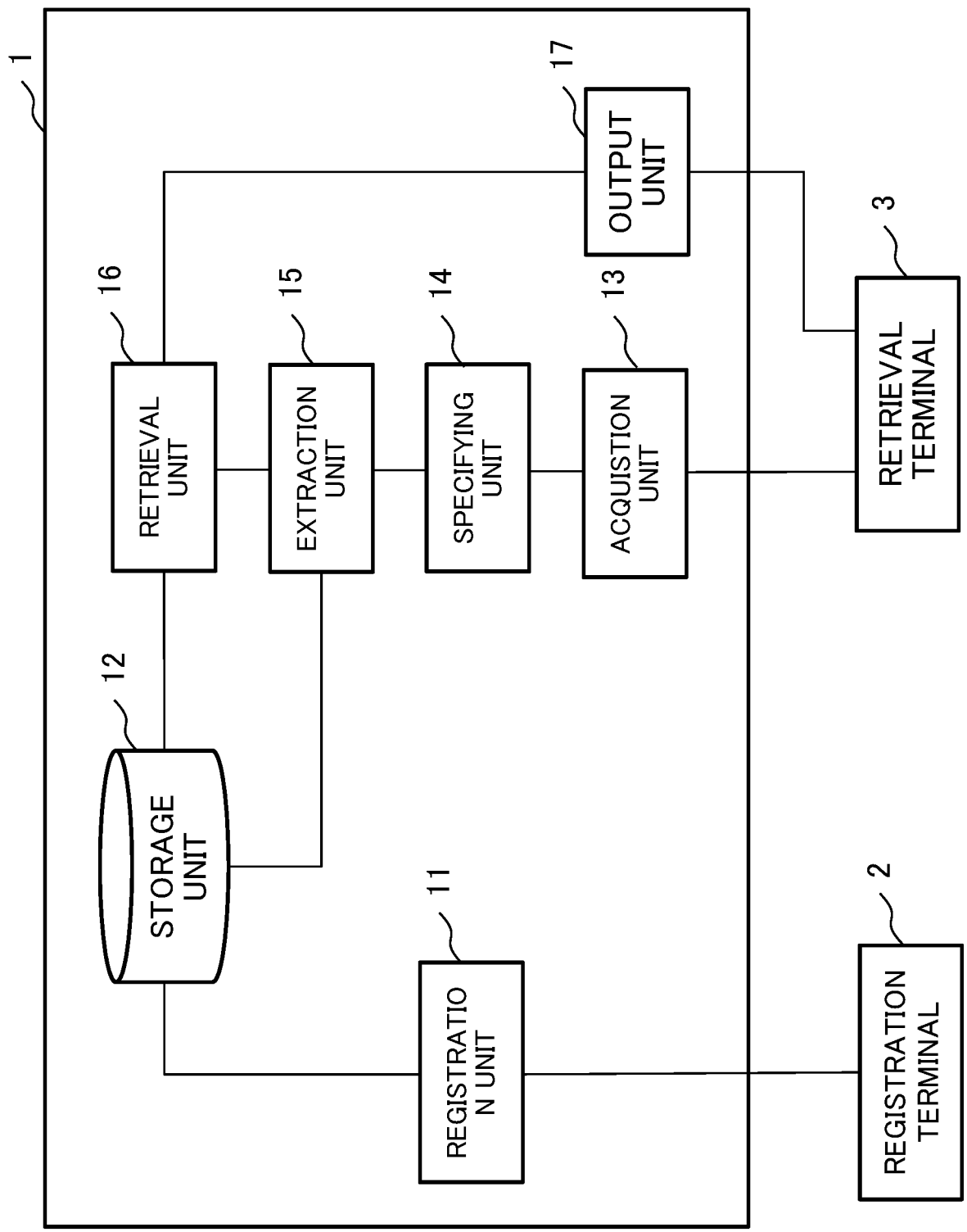
FIG. 18 is an example of functional blocks of an image retrieval system according to a modification of the first example embodiment.

FIG. 18 is an example of functional blocks of an image retrieval system according to a modification of the first example embodiment. The functional blocks of FIG. 18 are similar to the functional blocks of FIG. 3 but are different from those of the first example embodiment in that the storage unit 12 and the extraction unit 15 are connected. Further, in the first example embodiment, the storage unit 12 stores the registered image 101, the feature of the registered image 101, and the information related to the object to be registered in association with each other, whereas the modification is different from the first example embodiment in that the storage unit 12 does not store the feature of the registered image 101. Hereinafter, only configurations different from those of the first example embodiment will be described.

The extraction unit 15 in the modification extracts the feature from the registered image 101 stored in the storage unit 12. Then, the extraction unit 15 associates the extracted feature with the registered image 101.

The retrieval unit 16 in the modification retrieves the registered image 101 associated with the feature matching the feature of the retrieval image 102 according to the feature of the registered image 101 extracted by the extraction unit 15.

Second Example Embodiment

Figure 19:
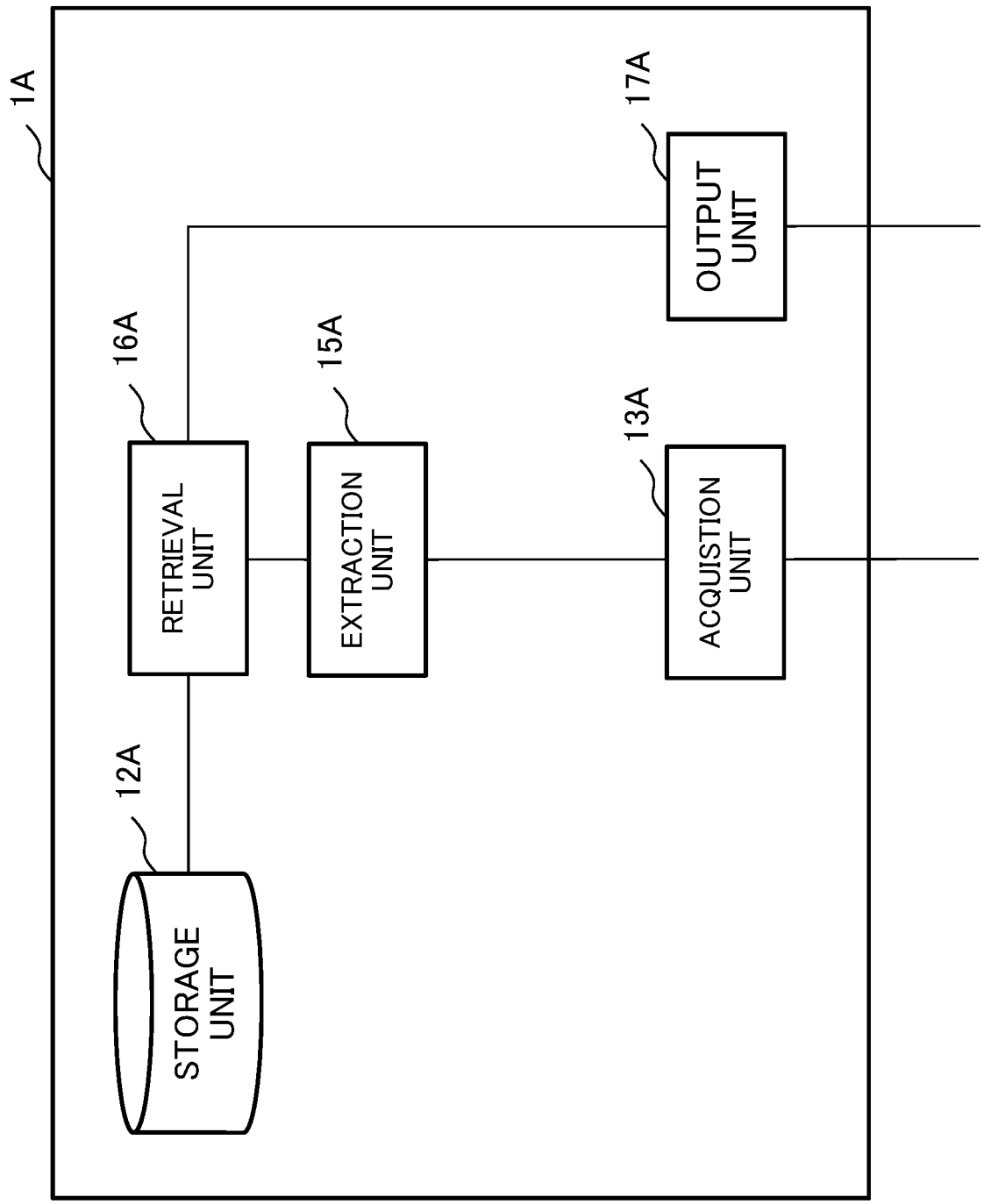
FIG. 19 is an example of functional blocks of an image retrieval system according to a second example embodiment.

FIG. 19 is an example of functional blocks of an image retrieval system according to the present example embodiment. As illustrated in FIG. 19, an image retrieval system 1A includes a storage unit 12A, an acquisition unit 13A, an extraction unit 15A, a retrieval unit 16A, and an output unit 17A.

For example, the storage unit 12 A, the acquisition unit 13A, the extraction unit 15A, the retrieval unit 16A, and the output unit 17A can be configured similarly to the storage unit 12, the acquisition unit 13, the extraction unit 15, the retrieval unit 16, and the output unit 17, respectively, but are not limited thereto.

The acquisition unit 13A acquires a retrieval image 102 including a region of interest and outputs the same to the extraction unit 15A. The extraction unit 15A extracts a feature from a region other than the region of interest in the retrieval image 102, and outputs the feature to the retrieval unit 16A. The retrieval unit 16A retrieves a registered image 101 having a feature matching the extracted feature, and outputs a retrieval result to the output unit 17A. The output unit 17A outputs some or all of the registered images 101 in a mode that a region corresponding to the region of interest of the retrieval image 102 is recognizable.

By the second example embodiment, the image retrieval system 1A can confirm what the region of interest of the target object was like at the time of registration in advance.

<Configuration Example of Hardware>

A hardware configuration of the image retrieval system according to the first example embodiment or the second example embodiment will be described below. The functional components of the image retrieval system in the first example embodiment or the second example embodiment may be implemented by hardware (for example, a hard-wired electronic circuit and the like) that implements the functional components, or may be implemented by a combination of hardware and software (for example, a combination of an electronic circuit and a program that controls the electronic circuit and the like). Hereinafter, a case where the functional configuration units of the image retrieval system according to the first example embodiment or the second example embodiment is implemented by a combination of hardware and software will be further described.

Figure 20:
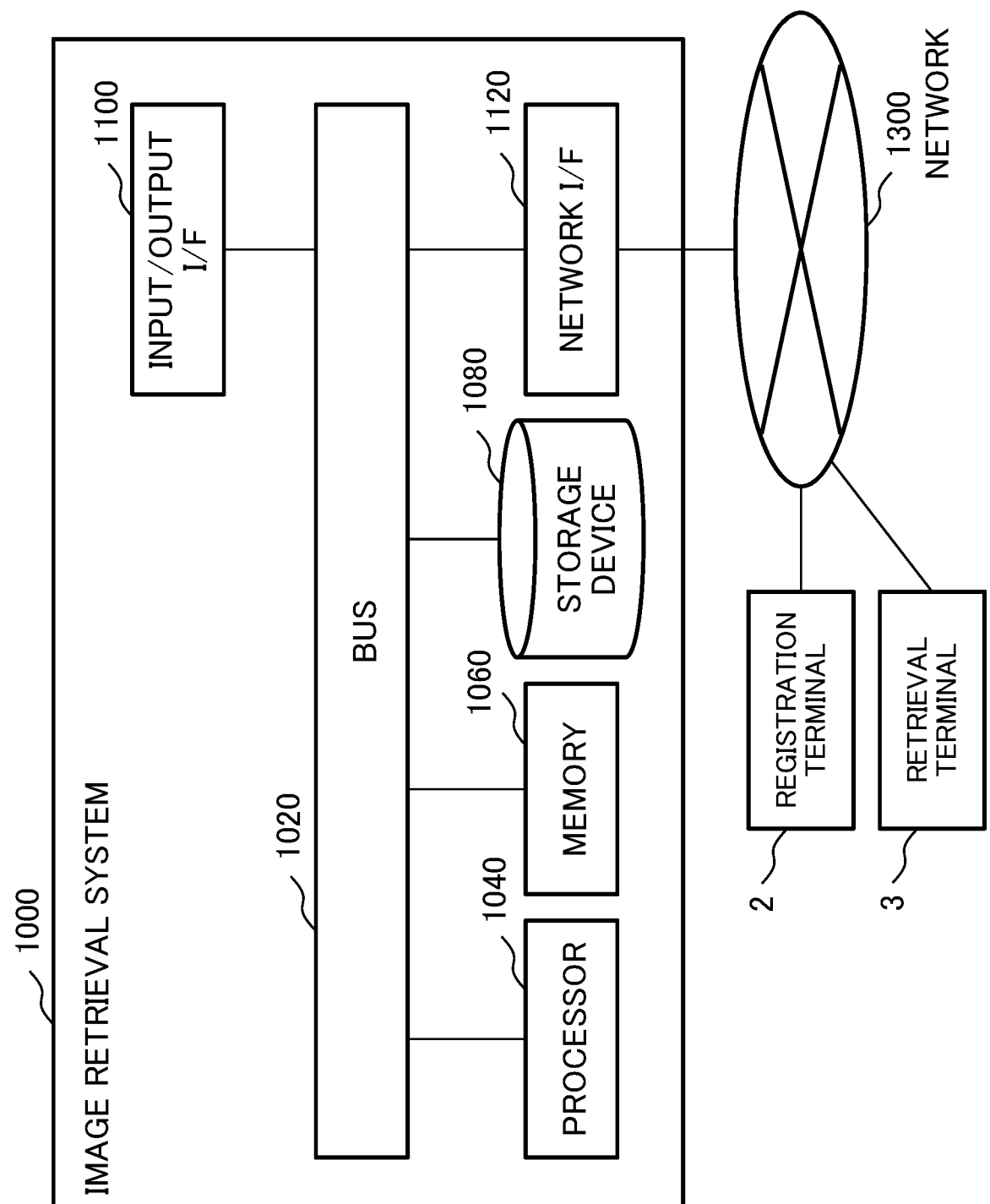
FIG. 20 is a block diagram illustrating an example of hardware constituting each unit of each example embodiment of the present invention.

FIG. 20 is a diagram illustrating a computer 1000, a network 1300, a registration terminal 2, and a retrieval terminal 3 for implementing the image retrieval system according to the first example embodiment or the second example embodiment. The computer 1000 is any computer. For example, the computer 1000 is a personal computer (PC), a server machine, a tablet terminal, a smartphone, or the like. The computer 1000 may be a dedicated computer designed to implement the image retrieval system in the first example embodiment or the second example embodiment, or may be a general-purpose computer.

The computer 1000 includes a bus 1020, a processor 1040, a memory 1060, a storage device 1080, an input/output interface (I/F) 1100, and a network interface (I/F) 1120. The bus 1020 is a data transmission path for the processor 1040, the memory 1060, the storage device 1080, the input/output interface 1100, and the network interface 1120 to transmit and receive data to and from one another. Note that the method of connecting the processor 1040 and the like to one another is not limited to the bus connection. The processor 1040 is one of various processors such as a central processing unit (CPU), a graphics processing unit (GPU), and a field-programmable gate array (FPGA). The memory 1060 is a main storage device implemented by using a random access memory (RAM) or the like. The storage device 1080 is an auxiliary storage device implemented by using a hard disk, a solid-state drive (SSD), a memory card, a read only memory (ROM), or the like.

The input/output interface 1100 is an interface for connecting the computer 1000 and an input/output device. For example, an input device such as a keyboard and an output device such as a display device are connected to the input/output interface 1100.

The network interface 1120 is an interface for connecting the computer 1000 to the network 1300. The network is, for example, a local area network (LAN) or a wide area network (WAN). The method of connecting the network interface 1120 to the network may be wireless connection or wired connection.

Moreover, the registration terminal 2 and the retrieval terminal 3 are connected to the network 1300, and the computer 1000, the registration terminal 2, and the retrieval terminal 3 can communicate data via the network 1300.

The storage device 1080 stores program modules that implement the units of the image retrieval system in the first example embodiment or the second example embodiment. The processor 1040 reads the program modules to the memory 1060 and executes the program modules, thereby implementing the functions related to the program modules.

Note that some functions of the image retrieval system in the first example embodiment or the second example embodiment may be executed on the side of the registration terminal 2 and the retrieval terminal 3. That is, a processor, a storage device, and a memory may be stored inside the registration terminal 2 and the retrieval terminal 3, and some or all pieces of the processing of the units of the image retrieval system in the first example embodiment or the second example embodiment may be executed using these components. For example, the processing of the registration unit 11 may be executed on the side of the registration terminal 2, and the other processing may be executed on the side of the computer 1000. Alternatively, the processing of the acquisition unit 13, the specifying unit 14, and the extraction unit 15 may be executed on the side of the retrieval terminal 3, and the processing of the retrieval unit 16 and the output unit 17 may be executed on the side of the computer 1000.

The retrieval terminal 3 may include a touch panel display such as a smartphone, and may be connected to both the acquisition unit 13 and the output unit 17. Furthermore, the retrieval terminal 3 may be a personal computer (PC) and a display, or the like, and the hardware connected to the acquisition unit 13 and the hardware connected to the output unit 17 may be separate.

The present invention has been described as an example applied to the above-described exemplary example embodiments. However, the technical scope of the present invention is not limited to the scope described in each of the above-described example embodiments. It is obvious to those skilled in the art that various changes or improvements to can be made to the example embodiments. In such a case, a new example embodiment to which such a change or improvement is added can also be included in the technical scope of the present invention. This is apparent from the matters described in the claims.

INDUSTRIAL APPLICABILITY

By using the image retrieval system of the present invention, it is possible to confirm what the region of interest of the target object was like at the time of registration in advance. Therefore, the manufacturer can verify that a defect or the like did not exist at the time of shipping from the manufacturer even if a defect or the like occurs in the target object later, by registering an image obtained by capturing the target object at the time of performing pre-shipment inspection. In addition, the image retrieval system of the present invention enables easy retrieval of an image to know a difference from previous registration even in a case of detecting a crack in an infrastructure such as a road or a tunnel.

(Supplementary Matters)

Note that the configurations of the above-described example embodiments may be combined or some components may be replaced. Further, the configuration of the present disclosure is not limited only to the above-described example embodiments, and various modifications may be made without departing from the gist of the present disclosure.

Some or all of the above example embodiments can be described as but are not limited to the following supplementary notes.

(Supplementary Note 1)

An image retrieval system including:

a storage means for storing a plurality of registered images to obtained by capturing a plurality of objects to be registered;

an acquisition means for acquiring a retrieval image including a region of interest;

an extraction means for extracting a feature from a region other than the region of interest of the retrieval image;

a retrieval means for retrieving, from the plurality of registered images stored in the storage means, a registered image having a feature that matches the feature extracted by the extraction means; and an output means for outputting some or all of the registered images retrieved by the retrieval means in a mode that a region corresponding to the region of interest in the retrieval image is recognizable.

(Supplementary Note 2)

The image retrieval system according to supplementary note 1, in which the output means outputs the some or all of the registered images retrieved by the retrieval means, by superimposing an image in which the region corresponding to the region of interest of the retrieval image is recognizable.

(Supplementary Note 3)

The image retrieval system according to supplementary note 1 or 2, in which the output means outputs the some or all of the registered images retrieved by the retrieval means, by superimposing an image in which a region corresponding to the region from which the feature of the retrieval image has been extracted is recognizable.

(Supplementary Note 4)

The image retrieval system according to any one of supplementary notes 1 to 3, in which the output means outputs the registered image retrieved by the retrieval means and an enlarged image of the region in the registered image, the region corresponding to the region of interest in the retrieval image retrieved by the retrieval means.

(Supplementary Note 5)

The image retrieval system according to any one of supplementary notes 1 to 4, in which the output means outputs the some or all of the registered images including the region corresponding to the region of interest of the retrieval image, and the retrieval image.

(Supplementary Note 6)

The image retrieval system according to any one of supplementary notes 1 to 5, in which the storage means stores information associated with each of the plurality of registered images, and the output means further outputs the information associated with the registered image retrieved by the retrieval means.

(Supplementary Note 7)

The image retrieval system according to any one of supplementary notes 1 to 6, in which the storage means stores registered images captured at a plurality of different timings in a distribution process of the objects to be registered, the retrieval means retrieves, from the plurality of registered images stored in the storage means, a registered image at each of the plurality of timings, the registered image having a feature that matches the feature extracted by the extraction means, and the output means outputs some or all of the registered images at the plurality of timings retrieved by the retrieval means in a mode that a region corresponding to the region of interest in the retrieval image is recognizable.

(Supplementary Note 8)

The image retrieval system according to any one of supplementary notes 1 to 7, further including:

a specifying means for specifying the region of interest of the retrieval image using the retrieval image.

(Supplementary Note 9)

The image retrieval system according to supplementary note 8, in which the specifying means divides the retrieval image acquired by the acquisition means into partial regions, and specifies the region of interest by determining presence or absence of a defect in each of the divided partial regions.

(Supplementary Note 10)

The image retrieval system according to any one of supplementary notes 1 to 7, in which the acquisition means further acquires information designating the region of interest, and the image retrieval system further including:

a specifying means configured to specify the region of interest of the retrieval image based on the information designating the region of interest acquired by the acquisition means.

(Supplementary Note 11)

The image retrieval system according to any one of supplementary notes 1 to 10, in which the extraction means extracts the feature from a region other than the region of interest, in a predetermined region including the region of interest.

(Supplementary Note 12)

The image retrieval system according to any one of supplementary notes 1 to 10, in which the extraction means extracts the feature from a predetermined region adjacent to the region of interest.

(Supplementary Note 13)

An image retrieval method including:

acquiring a retrieval image including a region of interest;

extracting a feature from a region other than the region of interest of the retrieval image;

retrieving, from a plurality of registered images obtained by capturing a plurality of objects to be registered, a registered image having a feature that matches the extracted feature; and outputting some or all of the retrieved registered images in a mode that a region corresponding to the region of interest in the retrieval image is recognizable.

(Supplementary Note 14)

The image retrieval method according to supplementary note 13, further including:

outputting the some or all of the retrieved registered images, by superimposing an image in which the region corresponding to the region of interest of the retrieval image is recognizable.

(Supplementary Note 15)

The image retrieval method according to supplementary note 13 or 14, further including:

outputting the some or all of the retrieved registered images, by superimposing an image in which a region corresponding to the region from which the feature of the retrieval image has been extracted is recognizable.

(Supplementary Note 16)

The image retrieval method according to any one of supplementary notes 13 to 15, further including:

outputting the retrieved registered image and an enlarged image of the region in the retrieved registered image, the region corresponding to the region of interest in the retrieval image.

(Supplementary Note 17)

The image retrieval method according to any one of supplementary notes 13 to 16, further including:

outputting the some or all of the registered images including the region corresponding to the region of interest of the retrieval image, and the retrieval image.

(Supplementary Note 18)

The image retrieval method according to any one of supplementary notes 13 to 17, in which the storage means stores information associated with each of the plurality of registered images, and the image retrieval method further including:

outputting the information associated with the retrieved registered image.

(Supplementary Note 19)

The image retrieval method according to any one of supplementary notes 13 to 18, in which the storage means stores registered images captured at a plurality of different timings in a distribution process of the objects to be registered, and the image retrieval method further including:

retrieving, from the plurality of registered images stored in the storage means, a registered image at each of the plurality of timings, the registered image having a feature that matches the extracted feature; and outputting some or all of the retrieved registered images at the plurality of timings in a mode that a region corresponding to the region of interest in the retrieval image is recognizable.

(Supplementary Note 20)

A storage medium storing a program for causing a computer to function as:

an acquisition means configured to acquire a retrieval image including a region of interest;

an extraction means configured to extract a feature from a region other than the region of interest of the retrieval image;

a retrieval means configured to retrieve, from a plurality of registered images obtained by capturing a plurality of objects to be registered and stored in a storage means, a registered image having a feature that matches the feature extracted by the extraction means; and an output means configured to output some or all of the registered images retrieved by the retrieval means in a mode that a region corresponding to the region of interest in the retrieval image is recognizable.

REFERENCE SIGNS LIST 1, 1A Image retrieval system
2 Registration terminal
3 Retrieval terminal
11 Registration unit
12 Storage unit
13, 13A Acquisition unit
14 Specifying unit
15, 15A Extraction unit
16, 16A Retrieval unit
17, 17A Output unit
101 Registered image
102 Retrieval image
1000 Computer
1020 Bus
1040 Processor
1060 Memory
1080 Storage device
1100 Input/output I/F
1120 Network I/F
1300 Network

The invention claimed is:

1. An image retrieval system comprising:
at least one memory storing instructions; and
at least one processor configured to access the at least one memory and execute the instructions to:
store, in a storage, a plurality of registered images obtained by capturing a plurality of objects to be registered;
acquire a retrieval image including a region of interest;
extract a feature from a region other than the region of interest of the retrieval image;
retrieve, from the plurality of registered images stored in the storage, a registered image having a feature that matches the feature; and
output some or all of the registered images in a mode that a region corresponding to the region of interest in the retrieval image is recognizable.

2. The image retrieval system according to claim 1, wherein
the at least one processor is further configured to execute the instructions to:
output the some or all of the registered images, by superimposing an image in which the region corresponding to the region of interest of the retrieval image is recognizable.

3. The image retrieval system according to claim 1, wherein
the at least one processor is further configured to execute the instructions to:
output the some or all of the registered images retrieved by the retrieval means, by superimposing an image in which a region corresponding to the region from which the feature of the retrieval image has been extracted is recognizable.

4. The image retrieval system according to claim 1, wherein
the at least one processor is further configured to execute the instructions to:
output the registered image retrieved by the retrieval means and an enlarged image of the region in the registered image, the region corresponding to the region of interest in the retrieval image.

5. The image retrieval system according to claim 1, wherein
the at least one processor is further configured to execute the instructions to:
output the some or all of the registered images including the region corresponding to the region of interest of the retrieval image, and the retrieval image.

6. The image retrieval system according to claim 1, wherein
the at least one processor is further configured to execute the instructions to:
store information associated with each of the plurality of registered images in the storage, and
output the information associated with the registered image.

7. The image retrieval system according to claim 1, wherein
the at least one processor is further configured to execute the instructions to:
store, in the storage, registered images captured at a plurality of different timings in a distribution process of the objects to be registered,
retrieve, from the plurality of registered images stored in the storage, a registered image at each of the plurality of timings, the registered image having a feature that matches the feature extracted by the extraction means, and
output some or all of the registered images at the plurality of timings in a mode that a region corresponding to the region of interest in the retrieval image is recognizable.

8. The image retrieval system according to claim 1, wherein
the at least one processor is further configured to execute the instructions to:
specify the region of interest of the retrieval image using the retrieval image.

9. The image retrieval system according to claim 8, wherein
the at least one processor is further configured to execute the instructions to:
divide the retrieval image into partial regions; and
specify the region of interest by determining presence or absence of a defect in each of the divided partial regions.

10. The image retrieval system according to claim 1, wherein the at least one processor is further configured to execute the instructions to:

acquire information designating the region of interest; and specify the region of interest of the retrieval image based on the information designating the region of interest.

11. The image retrieval system according to claim 1, wherein the at least one processor is further configured to execute the instructions to:

extract the feature from a region other than the region of interest, in a predetermined region including the region of interest.

12. The image retrieval system according to claim 1, wherein the at least one processor is further configured to execute the instructions to:

extract the feature from a predetermined region adjacent to the region of interest.

13. An image retrieval method comprising:

acquiring a retrieval image including a region of interest;

extracting a feature from a region other than the region of interest of the retrieval image;

retrieving, from a plurality of registered images obtained by capturing a plurality of objects to be registered, a registered image having a feature that matches the extracted feature; and outputting some or all of the retrieved registered images in a mode that a region corresponding to the region of interest in the retrieval image is recognizable.

14. The image retrieval method according to claim 13, further comprising:

outputting the some or all of the retrieved registered images, by superimposing an image in which the region corresponding to the region of interest of the retrieval image is recognizable.

15. The image retrieval method according to claim 13, further comprising:

outputting the some or all of the retrieved registered images, by superimposing an image in which a region corresponding to the region from which the feature of the retrieval image has been extracted is recognizable.

16. The image retrieval method according to claim 13, further comprising:

outputting the retrieved registered image and an enlarged image of the region in the retrieved registered image, the region corresponding to the region of interest in the retrieval image.

17. The image retrieval method according to claim 13, further comprising:

outputting the some or all of the registered images including the region corresponding to the region of interest of the retrieval image, and the retrieval image.

18. The image retrieval method according to claim 13, wherein the image retrieval method further comprising:

storage, in a storage, information associated with each of the plurality of registered images; and outputting the information associated with the retrieved registered image.

19. The image retrieval method according to claim 13, wherein the image retrieval method further comprising:

storing registered images captured at a plurality of different timings in a distribution process of the objects to be registered in a storage;

retrieving, from the plurality of registered images stored in the storage, a registered image at each of the plurality of timings, the registered image having a feature that matches the extracted feature; and outputting some or all of the retrieved registered images at the plurality of timings in a mode that a region corresponding to the region of interest in the retrieval image is recognizable.

20. A non-transitory storage medium storing a program for causing a computer to function as:

an acquisition means configured to acquire a retrieval image including a region of interest;

an extraction means configured to extract a feature from a region other than the region of interest of the retrieval image;

a retrieval means configured to retrieve, from a plurality of registered images obtained by capturing a plurality of objects to be registered and stored in a storage means, a registered image having a feature that matches the feature extracted by the extraction means; and an output means configured to output some or all of the registered images retrieved by the retrieval means in a mode that a region corresponding to the region of interest in the retrieval image is recognizable.

* * * * *